No. 788,273. Patented April 25, 1905.

UNITED STATES PATENT OFFICE.

ELISE MAROSI, OF NEW YORK, N. Y.

HAIR-TONIC.

SPECIFICATION forming part of Letters Patent No. 788,273, dated April 25, 1905.

Application filed August 30, 1904. Serial No. 222,704.

*To all whom it may concern:*

Be it known that I, ELISE MAROSI, a subject of the King of Austria-Hungary, and a resident of the city of New York, borough of Manhattan, in the county and State of New York, have invented a new and Improved Hair-Tonic, of which the following is a full, clear, and exact description.

The compound consists of the following ingredients combined in the proportions stated—viz., infusion of one-half pound of mustard seed, one-quarter pound of white rosin, and one pint of turpentine.

In order to produce the desired compound, I proceed in detail as follows: One-half pound of mustard-seed is soaked in a pint of water (preferably warm water) for about three weeks, and one-quarter pound of white rosin (preferably in powder form) is similarly soaked in a pint of water for about the same length of time. The mixtures are then separately strained under slight pressure through a cloth or other fabric, and the resultants therefrom are poured into a vessel, together with the turpentine, and the whole mixture is then stirred to thoroughly mix the ingredients with each other. For flavoring and reinforcing purposes a one-half cupful of lavender-spirit, one-half cupful of lavender-oil, and one-half cupful Florida water are added to the mixture.

The liquid compound is repeatedly rubbed on the bald head of the human body to insure the formation of a new growth of hair.

Having thus described my invention, I claim as new and desire to secure by Letters Patent—

1. The herein-described hair-tonic, containing an infusion of mustard-seed, rosin, turpentine, lavender-spirit, and perfume, in about the proportions stated.

2. The herein-described hair-tonic, consisting of an infusion of mustard-seed, rosin, turpentine, lavender-spirit, oil of lavender, and Florida water, in about the proportions stated.

In testimony whereof I have signed my name to this specification in the presence of two subscribing witnesses.

ELISE MAROSI.

Witnesses:
 THEO. G. HOSTER,
 EVERARD BOLTON MARSHALL.